United States Patent [19]

Schubert

[11] 4,170,278

[45] Oct. 9, 1979

[54] ELECTROMAGNETIC BRAKE

[76] Inventor: Karl P. Schubert, 6700 Larchmont Dr., Cleveland, Ohio 44124

[21] Appl. No.: 897,320

[22] Filed: Apr. 18, 1978

[51] Int. Cl.² ............................................ F16D 65/21
[52] U.S. Cl. ..................................... 188/161; 188/171
[58] Field of Search ....................... 188/161, 163, 171; 192/84 A, 84 C

[56] References Cited

U.S. PATENT DOCUMENTS

| | | | |
|---|---|---|---|
| 1,775,582 | 9/1930 | Baldwin | 188/171 |
| 2,698,679 | 1/1955 | Vernhes | 188/161 X |
| 3,504,773 | 4/1970 | Miller | 192/84 A X |

*Primary Examiner*—Duane A. Reger
*Attorney, Agent, or Firm*—Steele, Gould & Fried

[57] ABSTRACT

In an electromagnetic brake, disc shaped ferromagnetic armatures provide the braking effort and are included in stacks of brake discs flanking an annular electromagnet assembly formed by separate inner and outer annuli of ferromagnetic annuli, and an annular rigid coil unit concentrically between the annuli. The outer annulus is gapped so that a radial extension of the coil unit can pass through it, and fingers on one of the armature discs or upon a unit to which the brake is applied restrain the armatures, the coil unit, and any other stationary brake discs in the assembly against rotation. The armature discs may form either the innermost or the outermost discs in their respective stacks according to whether the brake is to be on or off when deenergized.

8 Claims, 4 Drawing Figures

4,170,278

ELECTROMAGNETIC BRAKE

FIELD OF THE INVENTION

This invention relates to electromagnetic brakes of the single, or more usually, multiple disc type.

BACKGROUND OF THE INVENTION

REVIEW OF THE PRIOR ART

In U.S. Pat. No. 3,902,581, issued Sept. 2, 1975 to Hans G. Knudsen, there is disclosed an electromagnetic brake or clutch in which an electromagnet having an annular core is flanked by two armature members which are drawn towards the core on energization of the electromagnet so as to clamp two stacks of plates of a multiplate clutch or brake between the armatures and the core and thus cause engagement of the brake or clutch. In U.S. Pat. No. 2,698,679, issued Jan. 4, 1955 to J. M. Vernhes, two armatures in the form of relatively axially movable discs are mounted for rotation with a shaft and may be drawn into braking engagement with the core of an electromagnet when the latter is energized. A clutch and a multi-disc brake are also described. The electromagnet core comprises an internal or external ferromagnetic disc or spider through which clutching or braking torque is transmitted, an outer and inner ferromagnetic annulus between which and the disc or spider a magnet coil is housed, and a non-magnetic metallic member uniting the annulus to the disc or spider to produce a structurally stong and rigid unit, which is however relatively complex to produce and must be exchanged as a whole in the event of a coil defect.

SUMMARY OF THE INVENTION

I have now found that an electromagnetic brake can be made which is much simpler and cheaper to construct than those referred to above, and also easier to maintain. According to my invention, an electromagnetic brake assembly, comprising an annular electromagnet assembly, two relatively axially movable disc shaped ferromagnetic armature members axially flanking the electromagnet assembly, and at least one rotatable annular brake disc engageable and disengageable with a non-rotatable annular friction surface upon relative axial movement of said armature members, is improved by forming the electromagnet assembly from an annular coil unit comprising an annular coil potted in a non-magnetic material to form a rigid assembly, and separate inner and outer annuli of ferromagnetic material respectively within and substantially surrounding and supported on the coil unit, the annuli being unattached to each other, and by providing locating means extending in the same direction as the axis of the assembly between said coil unit, said armature members and any additional member or members carrying said friction surface or surface to restrain them against relative rotational movement without restraining relative axial movement. The friction surface or surfaces may be carried either by the armature members or by separate non-rotating brake discs, and the movement of the armature members on energization of the electromagnet coil may be such as either to engage or disengage the brake disc or discs with the friction surface or surfaces. In the latter case, biasing means will be provided to maintain frictional engagement between the disc or discs and the friction surface or surfaces in the absence of energization.

Advantages of the structure defined above are several. The coil unit is formed separately, and may be readily replaced without the necessity for replacing the entire electromagnetic assembly, or for destroying the coil in order to remove it, as is necessary when, as is usual, the coil has been potted in situ in a channel in the electromagnet core. More important, the core structure is greatly simplified, the core being comprised by the inner and outer annuli, which need not be machined but may be formed by bending from bar stock. Since the annuli can be adequately located by the coil structure, no mounting lugs or the like need be provided. Preferably the outer annulus is gapped to accommodate a radial extension of the coil unit which is engaged by the locating means and through which electrical connections to the coil are established.

SHORT DESCRIPTION OF THE DRAWINGS

The invention is described further with reference to the accompanying drawings in which:

FIG. 1 is an axial section through a first embodiment of a brake in accordance with the invention, on the line I—I in FIG. II, FIG. 2 is a radial section through the same brake on the line II—II in FIG. 1, FIG. 3 is an axial section through a second embodiment of brake in accordance with the invention, on the line III—III in FIG. 4, and FIG. 4 is a radial section through the same brake on the line IV—IV in FIG. 3.

DESCRIPTION OF THE PREFERRED EMBODIMENTS

Figure 1:
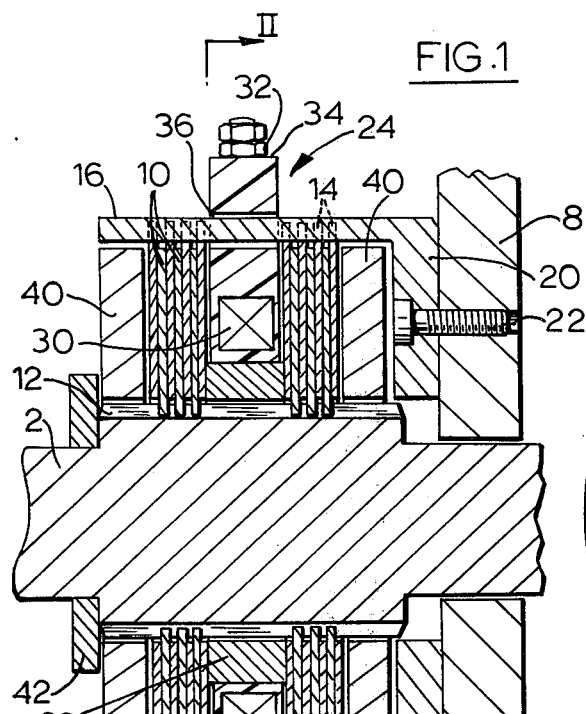
Figure 2:
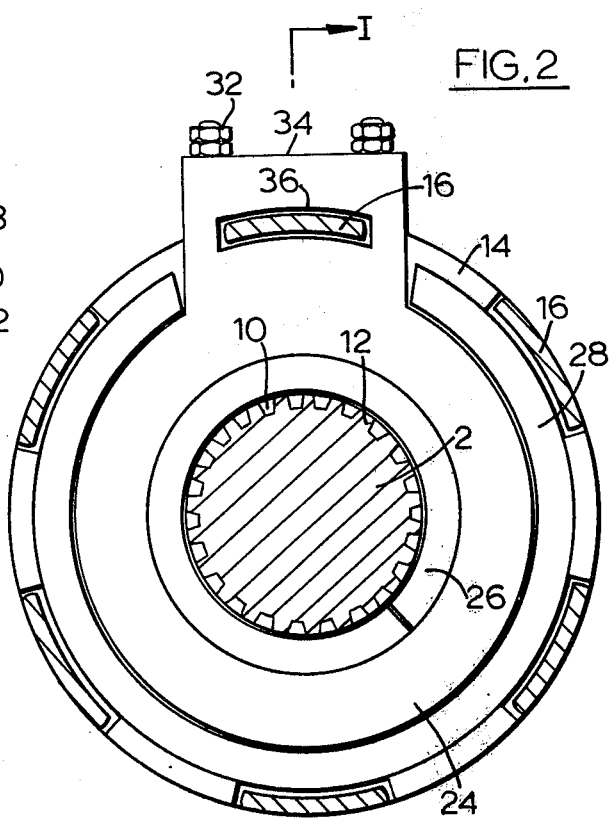

Referring to FIGS. 1 and 2, a multiple-disc brake is shown applied by way of example only, to a shaft 2 passing through a wall 8 which sustains the braking reaction. The brake comprises two sets of rotatable brake discs 10 axially movable upon but restrained against rotational movement relative to the shaft 2 by splines 12. The discs 10 of each set are sandwiched between sets of brake discs 14 which are restrained against rotation by locating means in the form of fingers 16 extending through slots 18 in their periphery. The fingers 16 extend from a disc 20 secured to the wall 8 by screws 22.

Between the stacks formed by the sandwiched sets of brake discs is an electromagnet assembly comprising a coil unit 24, an inner annulus 26 and an outer annulus 28. The coil unit comprises a coil or winding 30 potted in a synthetic resin composition to form a rigid assembly. The resin may be reinforced by fabric or other suitable laminating or reinforcing materials so as to provide the assembly with high physical strength. The ends of the winding 30 are brought out to terminals 32 through a radial extension 34 of the coil assembly, this extension having a window 36 through which one of the fingers 16 passes so as to restrain the coil against rotation. The outer annulus 28 is simply a length of soft iron or steel bar stock bent so as to surround the coil assembly 24 except for a gap for the extension 34. The inner annulus 26 may as shown be similarly formed, although without the gap, or may be formed by a short length of tube, or even integral with the shaft 2 if this has some degree of free axial movement.

Completing the stack of sandwiched brake discs furthest from the disc 20 is a further disc 40 which is restrained against rotational movement by the engagement of the fingers 16 with slots in its periphery, and is held captive adjacent the sandwiched brake discs by a retaining ring 42. Like the annuli 26 and 28, the discs 20 and 40 are both of ferromagnetic material and form armature members which together with the annuli complete the magnetic circuit of the electromagnet assembly. Thus when the coil 30 is energized, the axially displaceable disc 40 and annuli 26 and 28 are drawn toward the fixed disc 20, thereby compressing the stacks comprising the discs 20 and 40 and the rotatable and non-rotatable brake discs 10 and 14 and bringing them into frictional engagement so as to generate the required braking effort on the shaft 2.

It will be apparent that the assembly is easily assembled and disassembled, that the parts of the electromagnet assembly are of exceptionally simple and cheap construction, and that the assembly is compact and yet enables a high braking effort to be achieved.

Figure 3:
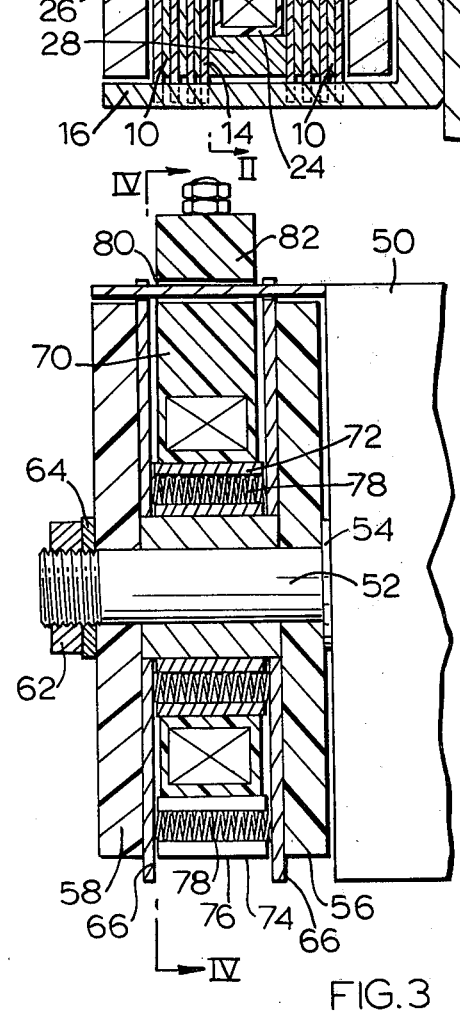
Figure 4:
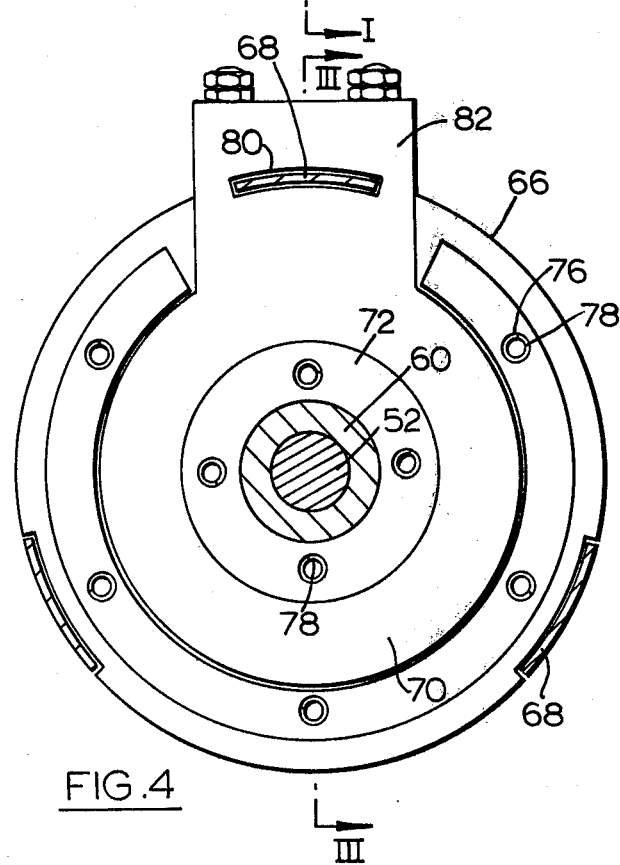

The embodiment of FIGS. 3 and 4 shows a safety brake intended for application to one end 52 of the shaft of an electric or other motor 50. The shaft end 52 has a shoulder 54 against which abuts a moulded synthetic plastic brake disc 56, separately from a further such disc 58 by a tubular spacer 60. The assembly is clamped tightly on the shaft by means of a nut 62 and washer 64, and the discs may be further secured against rotation relative to the shaft by keys or splines (not shown). Captive between the discs 56 and 58 is a sandwich comprising an electromagnet assembly between steel or iron brake discs 66. The brake discs 66 are restrained against rotation by fingers 68 extending from the body of the motor through slots in the peripheries of the discs. The magnet assembly comprises a coil assembly 70 and inner and outer annuli 72 and 74 which are similar to the assembly 24 and annuli 26 and 28 described in the previous embodiment except that at least one and preferably both of the annuli have bores 76 which house springs 78 acting so as normally to stack the discs 66 against the discs 56 and 58, thus pressing them into frictional engagement and restraining the shaft 52 against rotation. The coil assembly 70 is restrained against rotation by one of the fingers 68 which passes through a window 80 in a radial extension 82 of the unit.

When the coil of the coil assembly is energized, the discs 66 form armatures completing the magnetic circuit of the electromagnet assembly, and the discs 66 are drawn against the annuli 72 and 74 against the pressure of the springs 78, thus releasing them from frictional engagement with the discs 56 and 58. By placing the winding in series or parallel with the supply to the motor 50, the brake will thus be engaged except when the motor is energized.

What I claim is:

1. In an electromagnetic brake comprising an annular electromagnet assembly, two relatively axially movable disc shaped ferromagnetic armature members flanking the electromagnet assembly on either side, and at least one rotatable brake disc engageable and disengageable with a non-rotatable annular friction surface upon relative axial movement of said armature members, the improvement in which:

the electromagnet assembly comprises an annular coil unit comprising an annular coil potted in a non-magnetic material to form a rigid and separate assembly, and separate inner and outer annuli of ferromagnetic material respectively, within and substantially surrounding and supported on said coil unit, and locating means extend in the same direction as the axis of the assembly between said coil unit, said armature members and any additional member carrying said friction surface to restrain them against relative rotational movement without restraining relative axial movement.

2. An electromagnetic brake comprising an annular electromagnet assembly including a coil assembly and an axially compressible stack of at least two relatively axially movable frictionally engageable discs on each side of the assembly, one of said discs on each side of the assembly being a ferromagnetic armature member, means to restrain the coil assembly and at least those discs immediately flanking the electromagnet assembly on each side against rotation, and means to connect at least one other of the discs on each side of the electromagnet assembly to a rotatable member for rotation therewith, the electromagnet assembly comprising separate inner and outer concentric annuli and the coil assembly concentrically between the annuli, the coil assembly being rigid and separate from the annuli, the armature members and the annuli forming a magnetic circuit whereby on energization of a coil in the coil assembly there is relative axial movement of said armature members and said electromagnet assembly so as to change the state of compression of said discs in said stacks.

3. A brake according to claim 2, wherein the armature members are the outermost discs in each stack, whereby the stacks are compressed upon energization of the coil.

4. A brake according to claim 3, wherein each stack comprises discs restrained by said restraining means alternating with discs connected to said rotatable member.

5. A brake according to claim 3, wherein the restraining means comprises at least one finger extending in the direction of the axis of the brake from one of said armature members, said finger engaging slots in the periphery of the discs restrained against rotation and in a radial extension of the coil assembly, the outer annulus being gapped to accommodate said extension.

6. A brake according to claim 2, wherein the armature members are the innermost discs in each stack, and further including springs acting on said armature members to urge them axially apart towards discs comprised by said stack and rigidly connected to said rotatable member.

7. A brake according to claim 6, wherein the restraining means comprises at least one finger extending from apparatus a shaft of which forms the rotatable member, and the finger engages slots in the periphery of said armature members and in an extension of said coil assembly extending radially through a gap in said outer annulus.

8. A brake according to claim 2, wherein at least the outer annulus is formed by bending ferromagnetic bar stock to shape.

* * * * *